(No Model.)

N. B. STUBBLEFIELD.
ELECTRICAL BATTERY.

No. 600,457. Patented Mar. 8, 1898.

Witnesses
H. G. Dieterich
S. P. Nothan[?]

Inventor
Nathan B. Stubblefield
By his Attorneys,
C. A. Snow & Co.

UNITED STATES PATENT OFFICE.

NATHAN B. STUBBLEFIELD, OF MURRAY, KENTUCKY, ASSIGNOR OF ONE-HALF TO WILLIAM G. LOVE, OF SAME PLACE.

ELECTRICAL BATTERY.

SPECIFICATION forming part of Letters Patent No. 600,457, dated March 8, 1898.

Application filed October 24, 1896. Serial No. 609,969. (No model.)

*To all whom it may concern:*

Be it known that I, NATHAN B. STUBBLEFIELD, a citizen of the United States, residing at Murray, in the county of Calloway and State of Kentucky, have invented a new and useful Electrical Battery, of which the following is a specification.

This invention relates to electrical batteries; and it has for its object to provide a novel and practical battery for generating electrical currents of sufficient force for practical use, and also providing means for generating not only a constant primary current, but also an induced momentary secondary current.

It is well known that if any voltaic couple be immersed in water or placed in moist earth the positive element of the couple will undergo a galvanic action of sufficient intensity to produce a current when the terminals of the couple are brought in contact, and this form of battery is commonly known as the "water" battery, usually employed for charging electrometers, but not capable of giving any considerable current owing to their great internal resistance. Now the principle involved in this class of batteries is utilized to some extent in carrying out the present invention, but I contemplate, in connection with water or moisture as the electrolyte, the use of a novel voltaic couple constructed in such a manner as to greatly multiply or increase the electrical output of ordinary voltaic cells, while at the same time producing in operation a magnetic field having a sufficiently strong inductive effect to induce a current in a solenoid or secondary coil.

To this end the invention contemplates a form of voltaic battery having magnetic induction properties of sufficient intensity, so as to be capable of utilization for practical purposes, and in the accomplishment of the results sought for the invention further provides a construction of battery capable of producing a current of practically constant electromotive force and being practically free of the rapid polarization common in all galvanic or voltaic batteries.

With these and many other objects in view the invention consists in the novel construction, combination, and arrangement of parts hereinafter more fully described, illustrated, and claimed.

Figure 1:
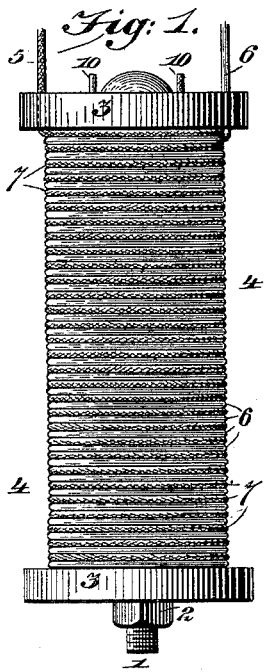
Figure 2:
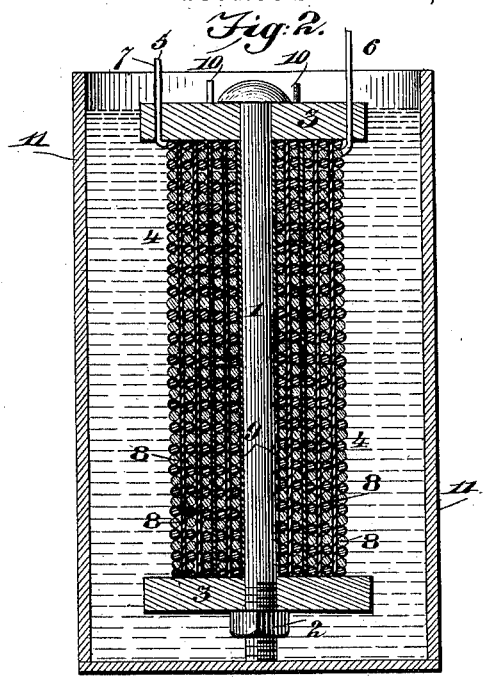
Figure 3:
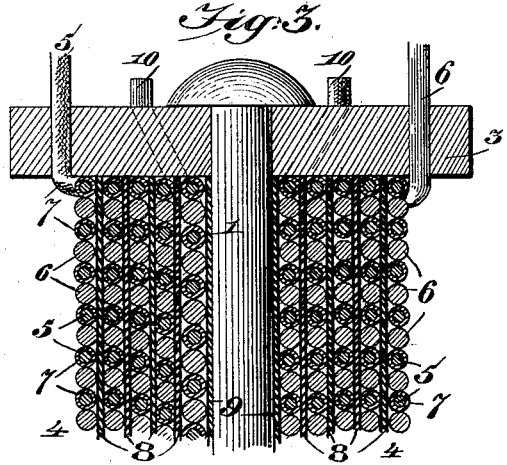
Figure 4:
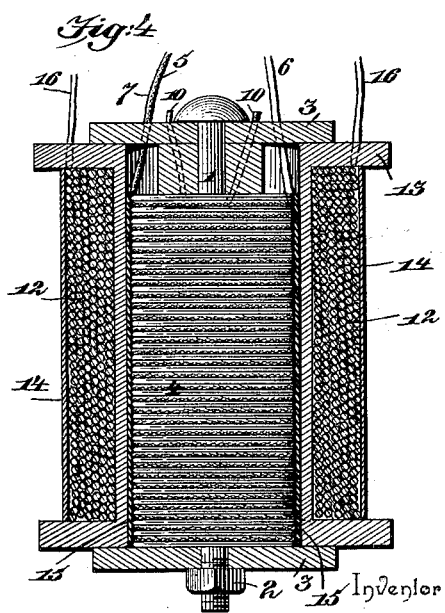

In the drawings, Figure 1 is a side elevation of an electrical battery constructed in accordance with this invention. Fig. 2 is a central longitudinal sectional view of the battery, showing the same immersed in water as the electrolyte. Fig. 3 is an enlarged sectional view of a portion of the battery, showing more clearly the manner of winding the voltaic couple or, in other words, the wires comprising the couple. Fig. 4 is a vertical sectional view of the battery, shown modified for use with an induction-coil.

Referring to the accompanying drawings, the numeral 1 designates a soft-iron core-piece extending longitudinally of the entire battery and preferably in the form of a bolt having at one end a nut 2, which permits of the parts of the battery being readily assembled together and also quite as readily taken apart for the purposes of repair, as will be readily understood. The central longitudinally-arranged core-piece 1 of the battery has removably fitted on the opposite ends thereof the oppositely-located end heads 3, confining therebetween the magnetic coil-body 4 of the battery, said heads 3 being of wood or equivalent material. The coil-body 4 of the battery is compactly formed by closely-wound coils of a copper and iron wire 5 and 6, respectively, which wires form the electrodes of the voltaic couple, and while necessarily insulated from each other, so as to have no metallic contact, are preferably wound in the manner clearly illustrated in Fig. 3 of the drawings.

In the preferred winding of the wires 5 and 6 the copper wire 5 is incased in an insulating-covering 7, while the iron wire 6 is a bare or naked wire, so as to be more exposed to the action of the electrolyte and at the same time to intensify the magnetic field that is created and maintained within and around the coil-body 4, when the battery is in operation and producing an electrical current. While the iron wire 6 is preferably bare or naked for the reasons stated, this wire may also be insulated without destroying the operativeness of the battery, and in order to secure the best results the wires 5 and 6 are wound side by side in each coil or layer of the windings, as clearly shown in Fig. 3 of the drawings, so that in each coil or layer of the windings there will be alternate convolutions of the copper and iron wires forming the voltaic couple, and it will of course be understood that there may be any number of separate coils or layers of the wires according to the required size and capacity of the battery. Each coil or layer of the windings is separated from the adjacent coils or layers by an interposed layer of cloth or equivalent insulating material 8, and a similar layer of insulating material 9 also surrounds the longitudinal core-piece 1 to insulate from this core-piece the innermost coil or layer of the windings.

The terminals 10 of the copper and iron wires 5 and 6 are disconnected so as to preserve the character of the wires as the electrodes of the voltaic couple; but the other or remaining terminals of the wires are brought in contact through the interposition of any electrical instrument or device with which they may be connected to cause the electric currents generated in the coil-body 4 to flow through such instrument or device.

In the use of the battery constructed as described the same may be immersed in a cell or jar 11, containing water as the electrolyte; but it is simply necessary to have the coil-body 4 moist to excite the necessary action for the production of a current in the couple, and it is also the contemplation of the invention to place the battery in moist earth, which alone is sufficient to provide the necessary electrolytic influence for producing an electric current.

It has been found that by reason of winding the couple of copper and iron wires into a coil-body the current traversing the windings of this body will produce a magnetic field within and around the body of sufficiently strong inductive effect for practical utilization by means of a solenoid or secondary coil 12, as illustrated in Fig. 4 of the drawings.

The solenoid or secondary coil 12 is of an ordinary construction, comprising a wire closely wound into a coil of any desired size on an ordinary spool 13 and incased within a protective covering 14 of mica, celluloid, or equivalent material. The spool 13 of the solenoid or secondary coil may be conveniently secured directly on the exterior of the coil-body 4 between the heads 3 with a suitable layer or wrapping of insulating material 15, interposed between the spool and the body 4, and the terminals 16 of the solenoid or secondary coil may be connected up with any instrument usually operated by secondary currents—such, for instance, as a microphone-transmitter or telegraphic relay. The magnetic field produced by the current traversing the coil-body 4 induces a secondary current in the solenoid or secondary coil 12, when the ordinary make and break of the primary current produced within the coil 4 is made between the terminals of said coil 4. It will therefore be seen that the construction of the battery illustrated in Fig. 4 is practically a self-generating induction-coil, and it can be used for every purpose that a coil of this character is used, for as long as the coil-body 4 is wet or damp with moisture electric currents will be produced in the manner described. It will also be obvious that by reason of the magnetic inductive properties of the coil-body 4 the core-piece 1 will necessarily be magnetized while a current is going through the body 4, so that the battery may be used as a self-generating electromagnet, if so desired, it being observed that to secure this result is simply required connecting the extended terminals of the wires 5 and 6 together after wetting or dampening the coil-body.

Many other uses of the herein-described battery will suggest themselves to those skilled in the art, and I will have it understood that any changes in the form, proportion, and the minor details of construction may be resorted to without departing from the principle or sacrificing any of the advantages of this invention.

Having thus described the invention, what is claimed, and desired to be secured by Letters Patent, is—

1. A combined electrical battery and electromagnet, for use with water as an electrolyte, comprising a soft-iron core-piece, and a voltaic couple of copper and iron wires insulated from each other and closely and compactly wound together in separate insulated layers to produce a solid coil-body surrounding the soft-iron core-piece, substantially as set forth.

2. An electrical battery for use with water as an electrolyte comprising a voltaic couple of insulated copper wire and bare iron wire closely wound into a coil-body, substantially as described.

3. An electrical battery for use with water as an electrolyte comprising a voltaic couple of insulated copper and bare iron wire wound side by side in separate insulated layers to produce a coil-body, substantially as described.

4. An electrical battery, for use with water as an electrolyte, comprising a voltaic couple having its separate electrodes insulated from each other and closely wound into a compact coil-body forming a self-generating primary coil when moistened and a solenoid or secondary coil fitted on the coil-body of the couple, substantially as set forth.

In testimony that I claim the foregoing as my own I have hereto affixed my signature in the presence of two witnesses.

NATHAN B. STUBBLEFIELD.

Witnesses:
 JOHN H. SIGGERS,
 W. B. HUDSON.